United States Patent
Becker et al.

(10) Patent No.: US 6,863,210 B2
(45) Date of Patent: Mar. 8, 2005

(54) METHOD AND CLAMPING FRAME FOR JOINING A NUMBER OF PIECE PARTS TO FORM A COMPLEX ASSEMBLED PART

(75) Inventors: Juergen Becker, Weinstadt (DE); Rainer Class, Winnenden (DE); Hans-Guenther Ziegler, Spiegelberg (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/344,354

(22) PCT Filed: Aug. 10, 2001

(86) PCT No.: PCT/EP01/09268

§ 371 (c)(1),
(2), (4) Date: Aug. 7, 2003

(87) PCT Pub. No.: WO02/14141

PCT Pub. Date: Feb. 21, 2002

(65) Prior Publication Data

US 2004/0020974 A1 Feb. 5, 2004

(30) Foreign Application Priority Data

Aug. 12, 2000 (DE) .......................................... 100 39 593

(51) Int. Cl.⁷ ............................................... B23K 31/02
(52) U.S. Cl. ........................ 228/212; 228/44.3; 228/213
(58) Field of Search ................................ 228/212, 213, 228/44.3, 49.1, 49.4, 175; 219/79, 86.24; 156/60

(56) References Cited

U.S. PATENT DOCUMENTS

| | | | | |
|---|---|---|---|---|
| 4,731,151 A | * | 3/1988 | Kaller et al. ................. | 156/556 |
| 4,795,075 A | * | 1/1989 | Pigott et al. ................... | 228/45 |
| 5,011,068 A | * | 4/1991 | Stoutenburg et al. ........ | 228/4.1 |
| 5,111,988 A | | 5/1992 | Strickland | |
| 5,272,805 A | * | 12/1993 | Akeel et al. ................... | 29/712 |
| 5,409,458 A | * | 4/1995 | Khairkhahan et al. . | 604/103.08 |
| 5,943,768 A | * | 8/1999 | Ray ............................. | 29/822 |
| 6,467,675 B1 | * | 10/2002 | Ozaku et al. ................ | 228/175 |
| 2003/0057256 A1 | * | 3/2003 | Nakamura et al. ......... | 228/49.1 |
| 2003/0071111 A1 | * | 4/2003 | McNamara et al. ........ | 228/212 |
| 2004/0020974 A1 | * | 2/2004 | Becker et al. .............. | 228/212 |

FOREIGN PATENT DOCUMENTS

| | | | |
|---|---|---|---|
| DE | 35 36 015 | | 4/1986 |
| DE | 44 18 755 | | 11/1995 |
| EP | 1 074 460 | | 2/2001 |
| JP | 08291297 A | * | 11/1996 |
| WO | 92/17312 | | 10/1992 |
| WO | 98/45085 | | 10/1998 |

\* cited by examiner

*Primary Examiner*—Kiley S. Stoner
(74) *Attorney, Agent, or Firm*—Kenyon & Kenyon

(57) ABSTRACT

In a method for assembling a plurality of component individual parts in stages to form a complex composite component, in order to achieve as high an accuracy as possible of the finished component, the individual parts are positioned relative to one another and fixed during the staged assembly process, such that there may be no need for any reclamping of the intermediate component between the individual assembly stages. For this purpose, a clamping frame is used, which is first equipped with some clamping elements, into which is introduced a first set of component individual elements which are assembled together with one another to form an intermediate component. In the second step, the clamping frame is equipped with further clamping elements, into which the component individual elements corresponding to them are introduced, and, in a further assembly step, these further component individual elements are assembled together with the intermediate component to form the finished component. For receiving and fixing the further clamping elements on the clamping frame, docking stations are provided, which may ensure a reproducible positioning and orientation of the clamping elements on the clamping frame.

9 Claims, 6 Drawing Sheets

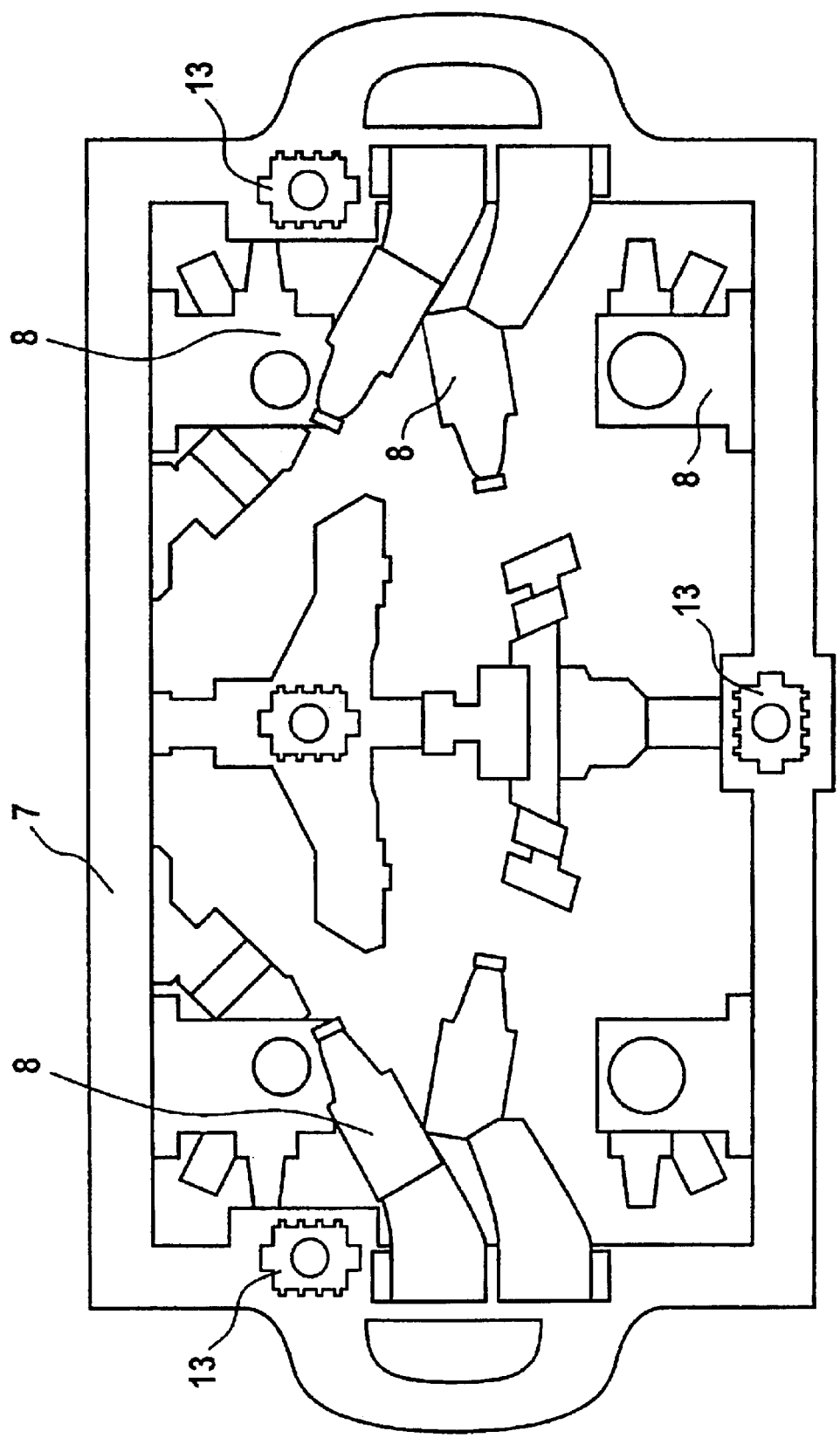

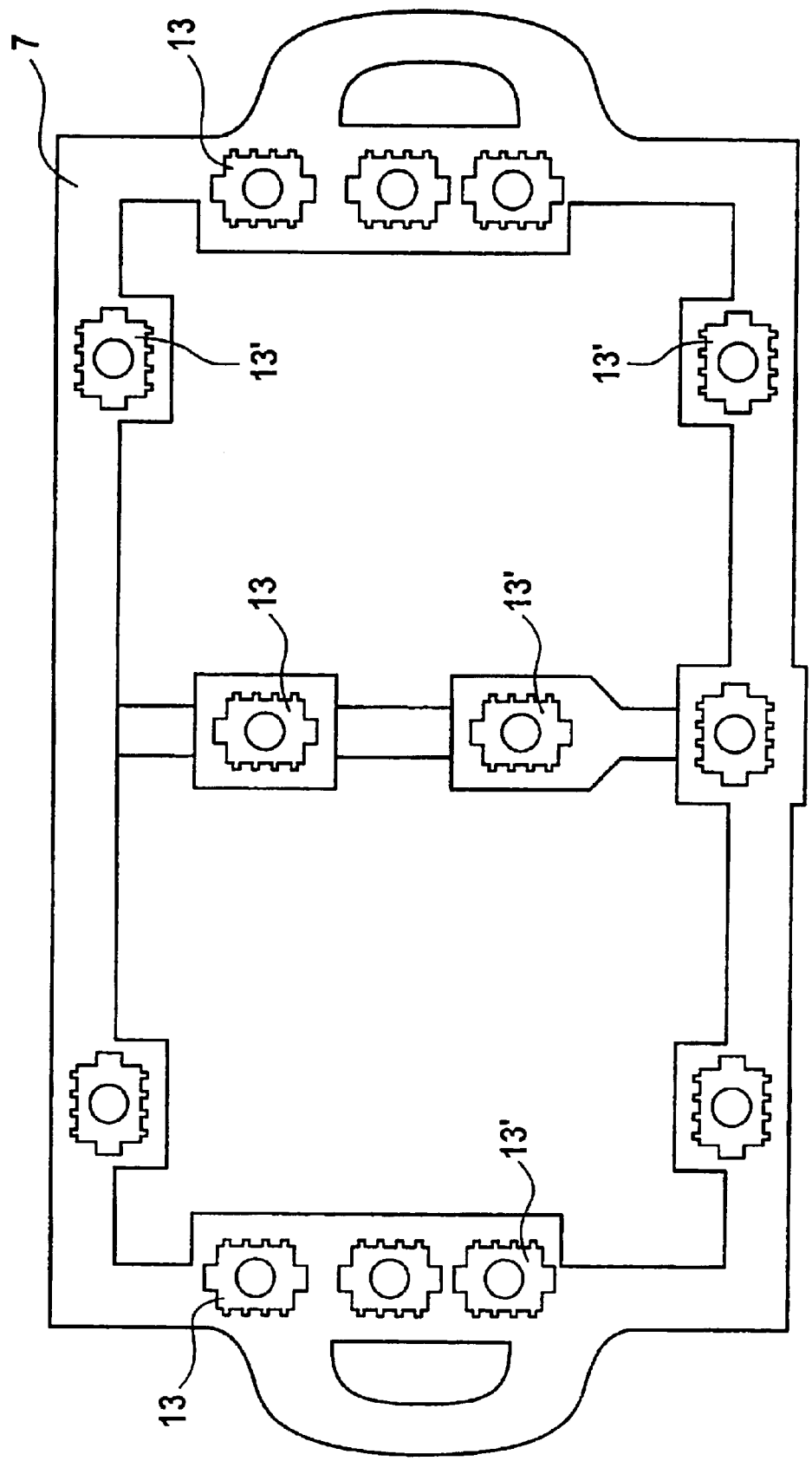

METHOD AND CLAMPING FRAME FOR JOINING A NUMBER OF PIECE PARTS TO FORM A COMPLEX ASSEMBLED PART

FIELD OF THE INVENTION

The present invention relates to a method for assembling a plurality of component individual parts to form a complex composite component and to a clamping frame for carrying out this method.

BACKGROUND INFORMATION

When a plurality of component individual parts are assembled to form a composite component, for example with the aid of a welding method, the individual parts are first fixed relative to one another in the assembly position and then connected to one another. To fix the individual parts, a clamping frame is used, having a plurality of clamping elements, with the aid of which the individual parts are clamped in a defined spatial position. At the same time, the clamping elements, in conjunction with the clamping frame, on the one hand, perform a positioning task, in that they orient exactly in a relative position to one another the individual parts to be connected and, on the other hand, they perform a fixing task, in that they hold the individual parts to be connected in firm contact with one another.

When the component to be assembled in this manner consists of a multiplicity of individual parts, it is often difficult for the clamping elements necessary for fixing these individual parts to be arranged together on the clamping frame such that they are not detrimental to one another and do not overly impair the spatial access of the assembly device, for example, the welding robot. To solve this problem, German Published Patent Application No. 35 36 015 describes, for the application of assembling a body, to arrange the clamping elements and the welding robots at a different height with respect to the clamping frame, for example by the clamping elements being fastened in suspension to the clamping frame, while the welding robots stand on the bottom of the assembly level. Whereas, in the case of the assembly of a vehicle body, this arrangement prevents the clamping elements and the welding robots from being detrimental to one another, it is suitable only for those applications in which there is no direct overlap of the welding robots with the clamping elements. It is therefore suitable mainly for the rapid tacking together of individual parts which are firmly connected to one another in a further process step, this time without clamping elements. Moreover, the method cannot be adopted when the individual parts to be assembled have overlaps and/or undercuts in the assembly regions when they are in the assembled position, so that the access of the assembly device into the assembly regions is obstructed by the clamping elements or by other individual parts.

The assembly of composite components with overlaps and/or undercuts is conventionally carried out in a multi-stage method, using a plurality of clamping frames: first, some of the individual parts are fastened to a first clamping frame by clamping elements and welded. The intermediate part occurring in this case is transferred into a second clamping frame which is equipped with further individual elements held in clamping elements, and there is welded to these further individual elements. Depending on the complexity of the component, a plurality of welding stages and therefore a plurality of clamping frames are required. This is highly cost-intensive, since each clamping frame represents high investment. Furthermore, the multiple reclamping of the intermediate part from clamping frame to clamping frame leads to inaccuracies in the component to be manufactured and is therefore not suitable for composite components to be assembled with high accuracy.

It is an object of the present invention to provide a cost-effective method, with the aid of which a plurality of individual parts, from which a complex composite component is to be assembled, may be positioned and fixed relative to one another during the assembly process, without multiple reclamping being necessary.

SUMMARY

The foregoing object may be achieved, according to the present invention, by providing a method and clamping frame as described herein.

Accordingly, the assembly of the individual elements to form a composite component, using a single clamping frame, is carried out in a plurality of process steps, in which, in stages, additional clamping elements equipped with individual elements are fastened at defined positions of the clamping frame and these additional individual elements are then assembled together with the individual elements already present: in the first step, the clamping frame contains only a few clamping elements with component individual elements fixed in them. These component individual elements are selected and the associated clamping elements configured such that the assembly regions between these individual elements are easily accessible for the assembly device and these individual elements may therefore be connected to one another along the assembly regions. After the assembly of this first set of individual elements to form an intermediate component, the clamping frame is then equipped with additional component individual elements which are fixed in further clamping elements. To receive these further clamping elements, the clamping device has provided on it docking stations, into which the clamping elements may be clamped reproducibly in a defined spatial position. The further clamping elements are configured and the position of the docking stations is selected such that the assembly regions between the additional component individual elements and the intermediate component are easily accessible for the assembly device and these component individual elements may then be connected to the intermediate component. Depending on the complexity of the component, even further process steps may be subsequently necessary, in the course of which further clamping elements equipped with component individual elements are inserted into defined docking stations and these individual elements are then assembled together with the intermediate component.

The method according to the present invention allows the multi-stage assembly of a plurality of component individual elements to form a complex component, only a single clamping frame being used, onto which the individual elements are clamped in succession and are assembled together with the remaining individual elements. By the reclamping of the semi-finished intermediate component being dispensed with, the dimensional accuracy of the component produced in this case may be increased considerably. Furthermore, dispensing with additional clamping frames may provide a high cost saving.

The method according to the present invention may, moreover, be capable of reacting quickly and flexibly to thermal distortions and dimensional changes during the assembly process: thus, for example, the sequence of assembly operations may be changed without high outlay by the sequence of docking steps being reversed. Such a change may be carried out quickly and cost-effectively, since no structural changes to the clamping frame may be necessary for this purpose. Furthermore, there is the possibility of carrying out dimensional adjustments and corrections on individual components, so that local changes are possible quickly and separately from the overall concept.

In the case of particularly complex components to be assembled together from a large number of individual parts, problems of access for the assembly device may arise in a multi-stage assembly method of the above-described type on account of the large number of clamping elements required for fixing the individual parts: thus, for example, it may happen that some clamping elements surround the assembly region so closely that a welding torch may not be led along that welding path which may be provided for achieving a good welding result. In such instances, it may be recommended, before the mounting of additional individual parts fastened in clamping elements, first to remove some of the clamping elements required in the preceding process step. The docking stations released in this case may still be used for fixing the clamping elements to be fastened in the next step.

To employ the method in large-series production, it may be provided to insert the clamping elements into the docking stations of the clamping frame in an automated manner with the aid of an industrial robot and, after the extraction of the finished component, to release the clamping elements from the docking stations with the aid of an industrial robot. It may be provided, moreover, to carry out the equipping of the clamping elements with component individual elements with the aid of an industrial robot.

The method according to the present invention may provide highly accurate production of complex components from aluminum, e.g., from sheet aluminum, which are to be composed of a plurality of individual parts with the aid of a welding method. In the welding of aluminum, the angle of incidence of the welding torch may be within narrow limits to achieve a good welded joint, and the direction of advance of the welding torch may be maintained with great accuracy. This places high requirements on the accessibility for the assembly region. The method according to the present invention may provide that, on the one hand, the mounting of further clamping elements with additional individual elements in steps and, on the other hand, the removal of clamping elements no longer required may ensure that, in each process step, the greatest possible free space may be provided for the guidance of the welding torch.

Furthermore, the method may be suitable for adhesive-bonding applications, since the large spatial dimensions of the adhesive-bonded head of an adhesive-bonding device may place high requirements on good accessibility.

The present invention is explained in more detail below with reference to an exemplary embodiment illustrated in the drawings.

BRIEF DESCRIPTION OF THE DRAWINGS

FIGS. 2a to 2d are top views of a clamping frame during the assembly of a plurality of individual elements to form a vehicle rear axle in which:

FIG. 2a illustrates the clamping frame with docking stations and clamping elements prior to equipping with the individual elements;

FIG. 2b illustrates the clamping frame with introduced individual elements;

FIG. 2c illustrates additional clamping elements with additional individual elements mounted on them; and FIG. 2d illustrates the clamping frame with additional clamping elements and additional individual elements fastened to it.

FIG. 3 illustrates the clamping frame illustrated in FIGS. 2a to 2d with docking stations instead of clamping elements.

DETAILED DESCRIPTION

Figure 1:
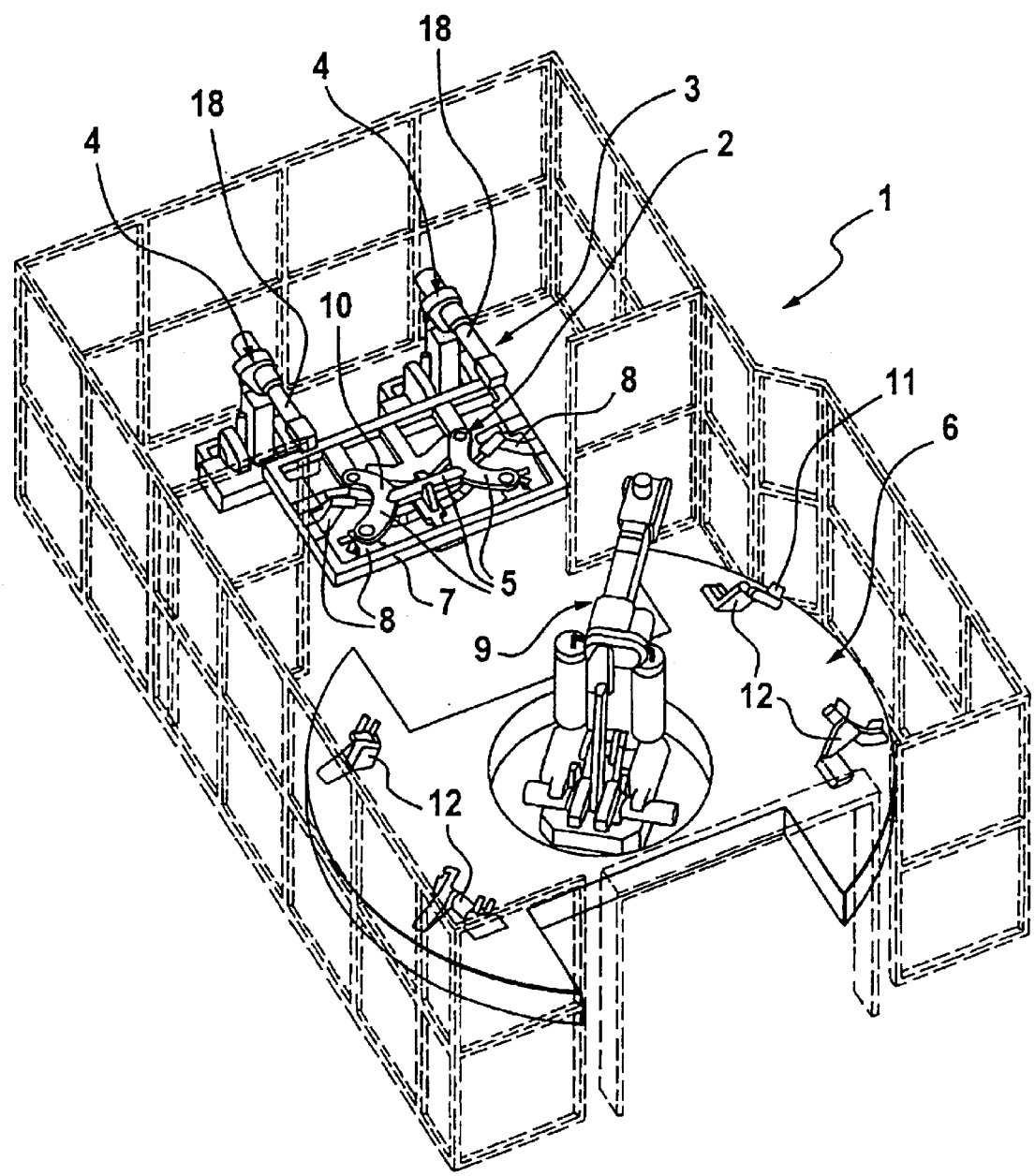
FIG. 1 is a schematic view of an overall plant for the assembly of a component, consisting of an introduction station and of an assembly station.

FIG. 1 illustrates a plant 1 for assembling a complex composite component 2 which is assembled together from a plurality of individual elements 5 in an assembly station 3 with the aid of an assembly device 4. The plant 1 includes, furthermore, an introduction station 6, in which a clamping frame 7 is equipped with the individual elements 5 to be assembled. The individual elements 5 are in this case positioned and fixed relative to one another in the assembly position on the clamping frame 7 by clamping elements 8. The equipped clamping frame 7 is then transferred into the assembly station 3 with the aid of a transport device in the form of a manipulator 9, e.g., an industrial robot. In the assembly station 3, the clamped-on individual elements 5 are connected with the aid of the assembly device 4 to form an intermediate component 10. The clamping frame 7 is subsequently transferred with the aid of the manipulator 9 (e.g., an industrial robot, alternatively a gantry and/or lifting unit, etc.) back to the introduction station 6, where it is equipped with further individual elements 11 which are clamped in additional clamping elements 12. To receive these additional clamping elements 12, the clamping frame 7 has provided on it docking stations 13, in which these additional clamping elements 12 may be latched in a position reproducible with high accuracy. In order to ensure reproducible positioning of the additional clamping elements 12, the docking stations 13 may include conical elements, into which the additional clamping elements 12 are latched and are fixed pneumatically, hydraulically, with the aid of detent pawls, etc. After the clamping frame 7 is equipped with these additional clamping elements 12 and with the additional individual elements 11 fixed in them, the clamping frame 7 is again transferred into the assembly station 3, in which the additional individual elements 11 are connected to the intermediate component 10.

Figure 2B:
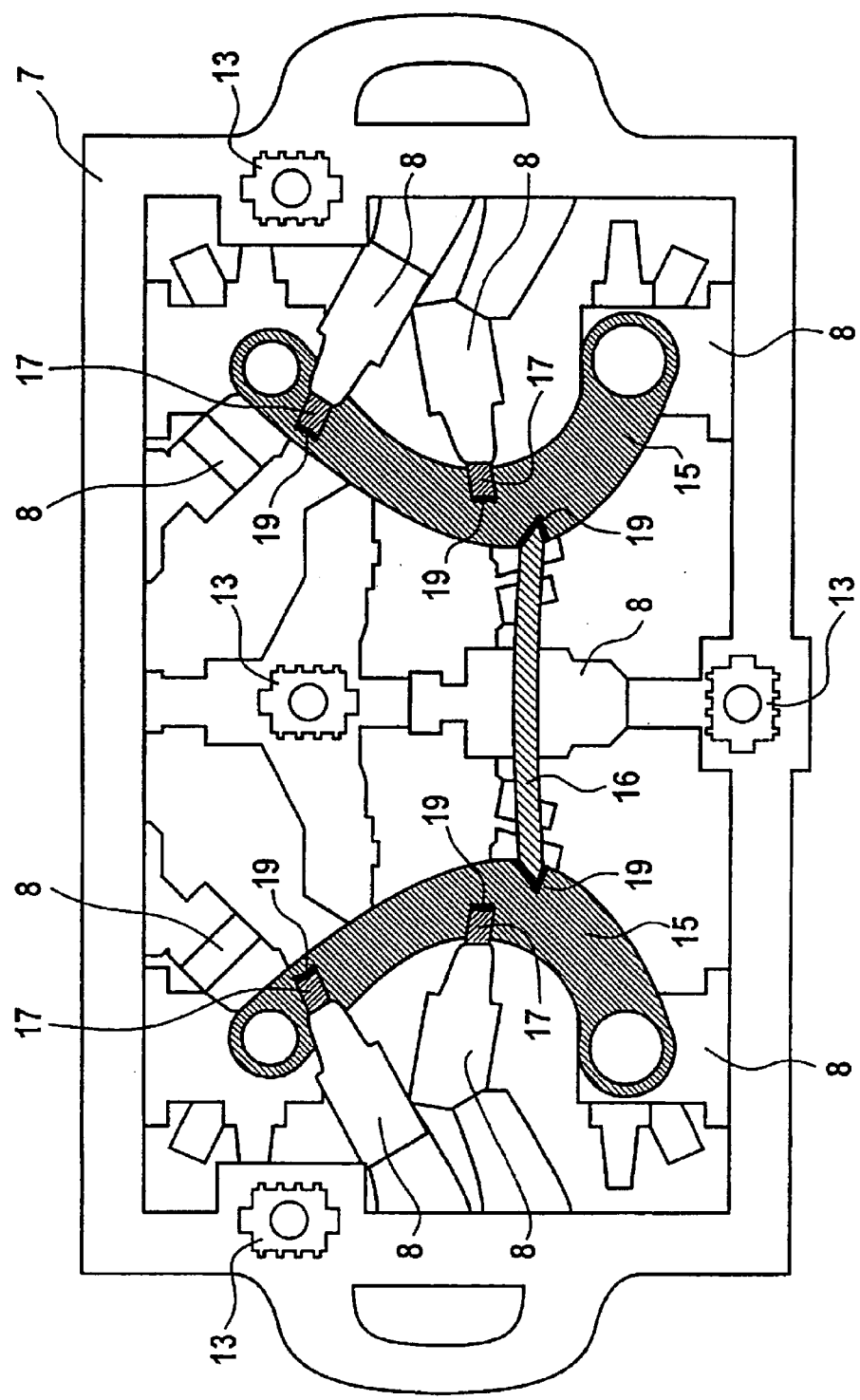

The assembly of a rear axle 14, which is to be welded together from a plurality of individual elements 5, 11 made of sheet aluminum, will be considered in FIGS. 2a to 2d as an example of the method outlined above. For this purpose, a clamping frame 7 is used, which, at the commencement of the first assembly step, has a plurality of clamping elements 8 and, in addition, four docking stations 13 which initially remain empty. FIG. 2a illustrates a top view of this clamping frame 7. The clamping frame 7 is loaded in the introduction station 6 by attendants with selected individual elements 5 of the set of parts for producing the rear axle 14 (in this case, with two side parts 15, a transverse bridge 16 and some additional mounting parts 17). These individual elements 15, 16, 17 (which are illustrated by hatching in FIGS. 2b to 2d) are brought into a spatial position corresponding to the assembly position and are clamped in this position to the clamping frame 7 with the aid of the clamping elements 8.

The clamping frame 7 thus equipped is transported with the aid of the manipulator 9 to the assembly station 3, in which the fixed set of parts of the individual elements 15, 16, 17 is welded together. For this purpose, the welding torch of a welding robot 18 is led along previously programmed-in welding paths over assembly regions on the individual elements 15, 16, 17 mutually braced relative to one another. FIG. 2b illustrates by hatching the intermediate component 10 which is obtained in this case. The weld seams 19 generated in the assembly station 3 are illustrated as emboldened lines.

Figure 2C:
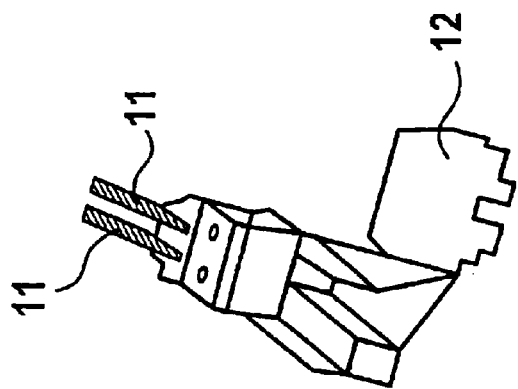
Figure 2C:
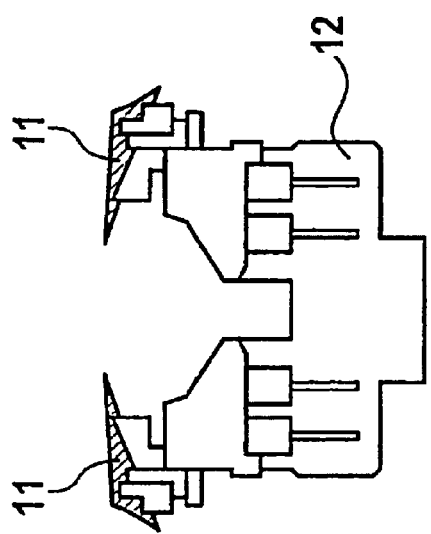
Figure 2C:
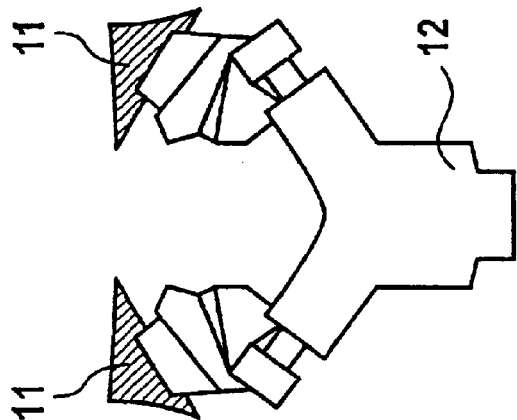
Figure 2C:
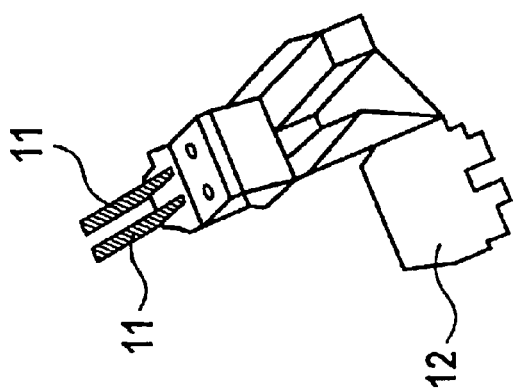
Figure 2D:
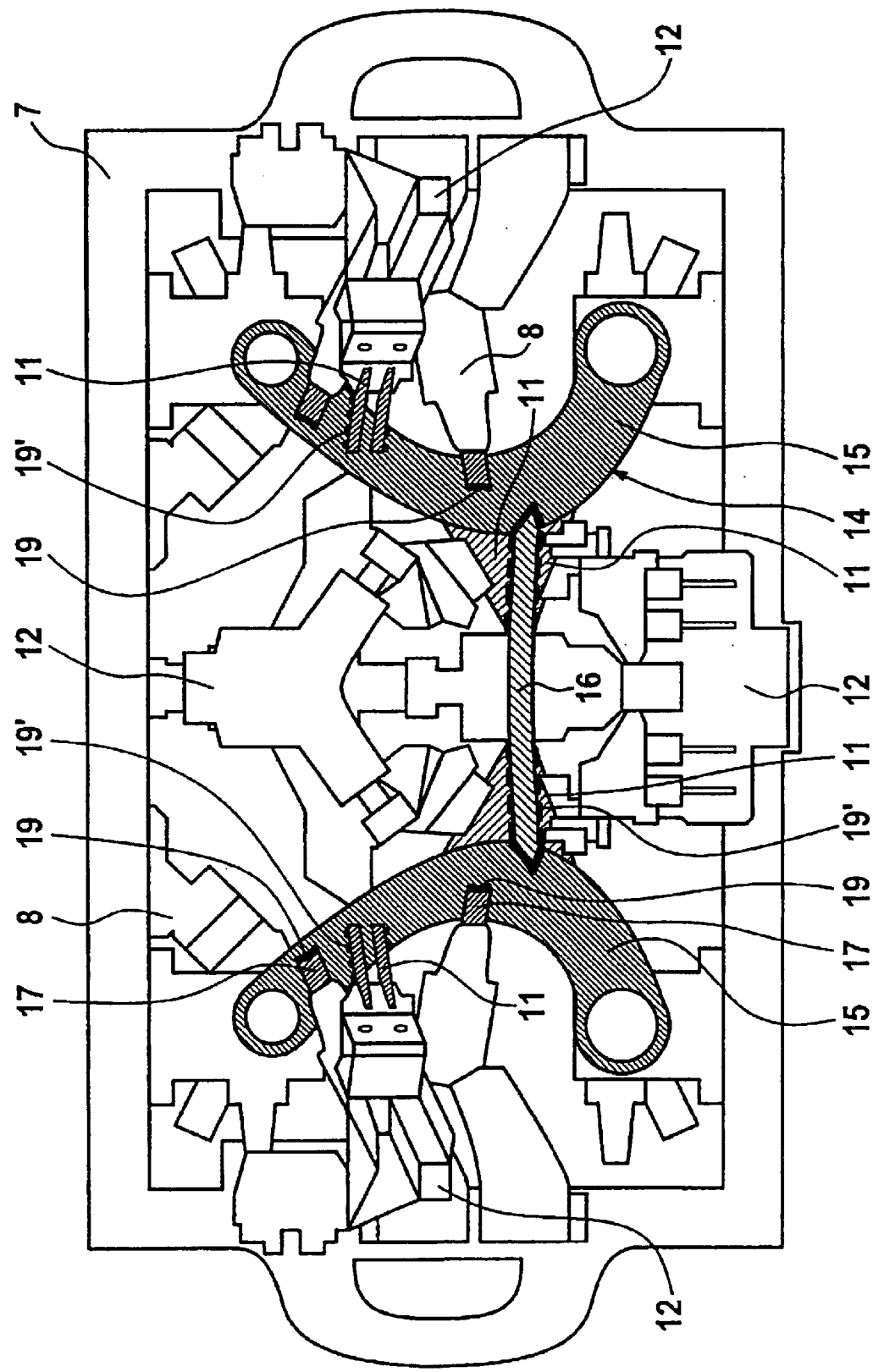

After welding has taken place, the clamping frame 7 together with the intermediate component 10 is extracted from the assembly station 3 with the aid of the manipulator 9 and is supplied again to the introduction station 6. The attendance crew moves the clamping frame 7 with further individual elements 11, clamped in additional clamping elements 12, from the set of rear-axle parts. FIG. 2c illustrates these additional clamping elements 12 loaded with the additional individual elements 11, the additional individual elements 11 being illustrated by hatching. Each additional clamping element 12 is latched by the attendance crew in a predefined position into the respective docking station 13 provided for this purpose (see FIG. 2d), and the clamping frame 7 thus equipped is supplied again to the assembly station 3, where the additional individual elements 11 are welded to the intermediate component 10. The weld seams 19' occurring in this case are illustrated in FIG. 2d as broken emboldened lines. Thereafter, the fixing of the clamping elements 8, 11 is released, and the finished rear axle 14 is extracted from the clamping frame 7. The additional clamping elements 12 latched into the docking stations 13 are removed from the clamping frame 7, equipped with new additional individual elements 11 and made ready for the production of a further rear axle 14. The empty clamping frame 7 is transported by the manipulator 9 back into its initial position and is loaded there once more with side parts 15, a transverse bridge 16 and the additional mounting parts 17.

In the present exemplary embodiment, a two-stage assembly process may be unavoidable: to be precise, the lightweight construction material aluminum, of which the individual parts 15, 16, 17, 11 consist, may place particularly high requirements on welding technology, in comparison with the welding of steel. Thus, when a weld seam 19, 19' is applied between two individual elements 15, 16, 17, 11, for example, the angle of incidence of the welding torch may be maintained within a narrowly limited angular range, in order to achieve a good welding result. So that this angular position along the entire seam 19, 19' may be ensured, good access for the welding torch in the seam regions may be guaranteed during the welding process, and this access in these regions may not be impaired by "disturbing" individual elements 11 or clamping elements 12. Thus, all the individual elements 11 which do not fulfil this requirement may first be removed, so that, in a first process step, the weld seams 19 located in these regions may be applied without obstruction. In a second process step, the "disturbing" individual elements 11 are then welded along the weld seams 19' to the intermediate component 10 produced in the first process step.

If, hitherto, a two-stage assembly method has been described, in which, in a first assembly step, an intermediate component 10 has been produced, which has been completed in a second assembly step by the welding-on of further individual elements 11 to form the finished component 2, it may be provided, e.g., in the case of highly complex components 2 with a large number of undercuts, to add the additional individual elements 11 to the intermediate component 10 in steps in a plurality of separate additional assembly steps. In this case, the clamping frame 7 is transferred back and forth multiply between the introduction station 6 and the assembly station 3. In the introduction station 6, in each assembly step, the clamping frame 7 is supplemented in each case by new additional individual elements 11 which are clamped into the associated clamping elements 12 and are fixed with respect to the intermediate component 10 by the clamping elements 12 being latched into the corresponding docking stations 13. These additional individual elements 11 are then assembled together with the intermediate component 10 in the assembly station 3.

Where complex composite components 2 are concerned, it may happen, e.g., when a three-stage or multi-stage assembly process is necessary for assembly, that, in a later assembly step, a clamping element 8, 12 required in an earlier assembly step obstructs in spatial terms the mounting of a further individual element 11' in its clamping element 12' or the assembly of this further individual element 11'. In this case, it is possible to remove the respective "disturbing" clamping element 8, 12 before the further individual element 11' is fastened on the clamping frame 7. This may provide that a docking station 13 which may possibly be released in the event of the extraction of the "disturbing" clamping element 8, 12 may be utilized for fastening this (or a further) clamping element 12'. Alternatively, the "disturbing" clamping element 8, 12 may be provided with a pivoting device which allows this clamping element 8, 12 to be pivoted out of the critical region. In this case, however, in each of the two alternatives, it may be necessary to ensure that, in spite of the removal of the respective "disturbing" clamping element 8, 12, the intermediate component 10 remains securely fixed on the clamping frame 7.

Furthermore, the variability and the reusability of the clamping frame 7 may be increased considerably if not only the additional clamping elements 12, but also the clamping elements 8 originally provided are fastened to the clamping frame 7 via docking stations 13, 13'. FIG. 3 illustrates an example of such a clamping frame 7 for the rear axle 14 illustrated in FIGS. 2a to 2d, the clamping frame having a multiplicity of docking stations 13, 13'. In the event of changes to the component 2 to be welded, in such a case, only the corresponding clamping elements 8, 12 may need to be exchanged, whereas the clamping frame 7 may continue to be used, unchanged. Thus, one and the same clamping frame 7 may be employed, in particular, for the production of rear axles 14 of different variants and construction series.

In order to ensure a highly accurate positioning of the welding paths, the clamping frame 7 may additionally be provided with sensors, the signal from which is utilized for the highly accurate guidance of the welding robot 18.

If, hitherto, a manual equipping of the clamping frame 7 with individual elements 15, 16, 17, 11 has been described, in which an assembly crew introduces the individual elements 5 in the clamping elements 8 of the clamping frame 7 and fixes them or manually latches into the docking stations 13 the additional clamping elements 12 equipped with additional individual elements 11, both the equipping of the clamping frame 7 with side parts 15, a transverse bridge 16 and mounting parts 17 in the first assembly step and the equipping of the additional clamping elements 12 with additional individual elements 11 may alternatively also take place automatically with the aid of an industrial robot. Furthermore, the supply and latching of the additional clamping elements 12 provided with the additional individual elements 11 into the docking stations 13 of the clamping frame 7 in the second assembly step may also take place automatically with the aid of an industrial robot.

The design of the clamping frames 7 with the corresponding docking stations 13, 13' and clamping elements 8, 12, 12' and the detailed sequence planning of the successive mounting and assembly steps constitute, e.g., in the case of multi-stage assembly processes for the assembly of complex components 2, an extremely complex planning task which is achieved, e.g., with the aid of a CAD system which allows both a simulation of the individual mounting and assembly steps and full collision examination.

The assembly method according to the present invention may be suitable for the production of any composite components 2 which have to be assembled together in a multi-stage manner, that is to say in a plurality of assembly steps, from individual parts by virtue of the selected assembly method and/or the spatial position of the assembly regions. Since the intermediate component 10 remains on the same clamping frame 7 during the entire method, that is to say does not need to be reclamped, the method may be suitable, e.g., for those applications in which very high requirements are placed on the accuracy of the finished component 2. Thus, by the steps, illustrated in FIGS. 2a to 2d, for producing a rear axle 14, the assembly-related tolerances on the rear axle 14 may be reduced to 0.3 mm, this being a considerable improvement in dimensional accuracy, as compared with the conventional assembly method in which the rear axle 14 has been produced by multiple reclamping onto different clamping frames, and in which the tolerances of the ready-assembled rear axle 14 have been around 1 mm. Moreover, when the method according to the present invention is used, only a single clamping frame 7 may be required for fixing the rear axle 14 during assembly, thus affording considerable cost benefits. Examples of further applications of the method in vehicle construction are the production of frame structures and body components, such as, for example, integral members, instrument carriers and A-, B- and C-pillars.

In addition to the above-described use in welding applications, in particular for the welding of aluminum sheets, the method according to the present invention may provide advantages for adhesive-bonding applications: since, in large-series use, the adhesive beads are applied by very bulky applicator devices, the assembly regions of the components to be adhesively bonded may, when in the assembly position, be largely free of clamping devices 12 and overlapping additional individual elements 11, in order to ensure that the applicator device has good access. Here, too, it may be provided that, for the assembly of complex components 2, the individual parts 5, 11 be adhesively bonded to one another in steps, during all the individual steps the intermediate component 10 remaining firmly on the clamping frame 7 and the additional individual elements 11 being fixed with respect to the intermediate component 10 and adhesively bonded in successive mounting steps with the aid of clamping elements 12.

What is claimed is:

1. A method for assembling a plurality of component individual elements to form a complex composite component, comprising:

(a) introducing the component individual elements in a predetermined spatial orientation into clamping elements adapted to a geometry of a corresponding component individual element;

(b) positioning the component individual elements fixed in the clamping elements relative to one another with a clamping frame receiving the clamping elements;

(c) equipping the clamping frame in an introduction station with clamping elements into which the corresponding component individual elements are introduced in the introducing step;

(d) arranging the equipped clamping frame in an assembly station and assembling the component individual elements with one another to form an intermediate component;

(e) arranging the clamping frame together with the intermediate component located thereon in the introduction station and equipping the clamping frame with further clamping elements into which corresponding additional component individual elements are introduced in the introducing step; and (f) arranging the equipped clamping frame again in the assembly station and assembling the additional component individual elements with the intermediate component to form a finished component.

2. The method according to claim 1, further comprising removing at least one of the clamping elements equipped in the equipping step (c) before the clamping frame is equipped with the further clamping elements in the step (e).

3. The method according to claim 1, wherein the clamping frame is equipped with at least one of the clamping elements in the equipping step (c) and the further clamping elements in the step (e) in an automated manner with an industrial robot.

4. The method according to claim 1, wherein the component individual elements are introduced into the clamping elements in the introducing step (a) in an automated manner with an industrial robot.

5. The method according to claim 1, wherein the component individual elements are made of aluminum, the method further comprising welding the component individual elements.

6. The method according to claim 1, further comprising adhesively bonding the component individual elements.

7. The method according to claim 1, wherein the component individual elements are made of aluminum, and at least one of the component individual elements are assembled in the step (d) and the further component individual elements are assembled in the step (f) by welding.

8. The method according to claim 1, wherein at least one of the component individual elements are assembled in the step (d) and the further component individual elements are assembled in the step (f) by adhesive bonding.

9. The method according to claim 1, wherein the clamping frame includes docking stations configured to releasably bind the further clamping elements and to ensure on the clamping frame a reproducible spatial orientation of the further clamping elements and of component individual elements located on the further clamping elements.

* * * * *